United States Patent [19]
Churchill

[11] 3,727,160
[45] Apr. 10, 1973

[54] RETAINING CLIP FOR A SOLENOID ASSEMBLY

[75] Inventor: Alan W. Churchill, Morristown, N.J.

[73] Assignee: Automatic Switch Company, Florham Park, N.J.

[22] Filed: Mar. 24, 1972

[21] Appl. No.: 237,726

[52] U.S. Cl. .................335/251, 335/255, 335/278
[51] Int. Cl. ...............................................H01f 3/00
[58] Field of Search......................335/251, 255, 278

[56] References Cited

UNITED STATES PATENTS

| | | | |
|---|---|---|---|
| 2,627,544 | 2/1953 | Eck | 335/251 X |
| 3,117,257 | 1/1964 | Stone | 335/251 X |
| 3,281,740 | 10/1966 | Riefler | 335/255 |
| 3,295,079 | 12/1966 | Brown | 335/255 |

*Primary Examiner*—George Harris
*Attorney*—Alan H. Levine

[57] ABSTRACT

A solenoid assembly including a core tube having a peripheral groove, a housing having a hole through which the core tube extends, and a retaining clip coupled to the groove to prevent the core tube from slipping into the housing. The retaining clip is a unitary, preferably metallic, structure having a main section and a locking member. The main section includes a hole which is slightly larger in diameter than the core tube, and a smaller diameter hole extension, the edge of the hole extension being engageable with the groove. The locking member extends over the main section and includes a projection which extends perpendicularly towards the center of the hole. To attach the clip to the assembly, the hole is slipped over the core tube and the main section is pushed against the housing. As the main section is pushed towards the wall, the projection abuts the end of the core tube and causes the locking member to bend. Thereafter, as the clip is moved perpendicularly with respect to the axis of the core tube, the edge of the radial hole extension engages the groove, the projection reaches the circumferential edge of the end of the core tube and snaps past it as the locking member straightens out, thereby locking the assembly in place.

11 Claims, 5 Drawing Figures

PATENTED APR 10 1973  3,727,160
FIG. 1
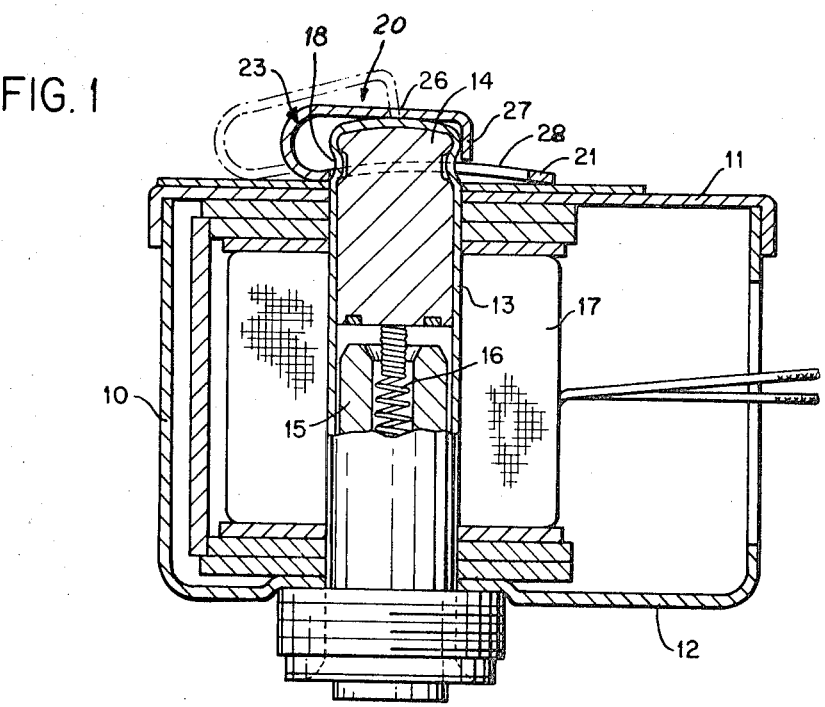
FIG. 2
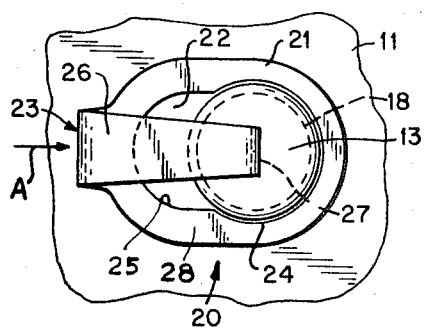
FIG. 3
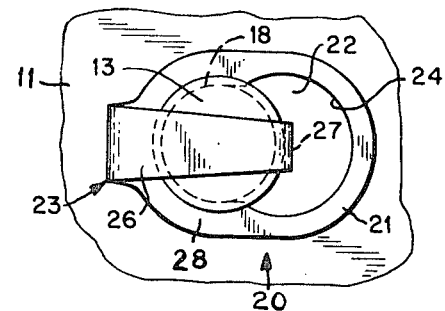
FIG. 4
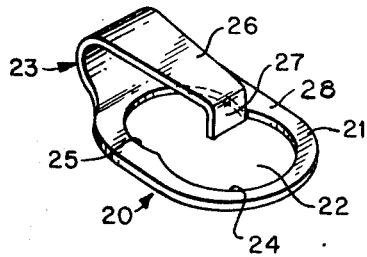
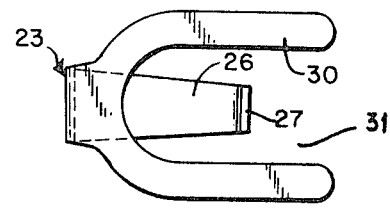
FIG. 5

RETAINING CLIP FOR A SOLENOID ASSEMBLY

This invention relates generally to solenoid assemblies, and has particular reference to the securement to a solenoid core tube of the housing in which the solenoid is enclosed.

It is common practice for a solenoid core tube to be arranged within a housing so that its ends project outwardly beyond two opposed walls of the housing. One end is open, for transmission of the movements of the solenoid core to the valve or other mechanism to be controlled. The other end is closed, and is clamped so as to secure it in position with respect to the adjacent housing wall. Springy wires and the like, encircling the core tube and retained within an annular groove, have often been used for this purpose.

It is a general object of the present invention to provide an improved means for clamping or gripping the end of the core tube.

Among the more particular objectives are the provision of a retaining clip which is readily applied during the manufacture of the solenoid assembly, whose application requires no special tools, which is resiliently yieldable so that it is effective to take up slack due to dimensional variations in the core tube and housing, and which engages the tube firmly and reliably, is practically irremovable after it has been installed, and is not subject to loosening or removal under conditions of shock or vibration.

The retaining clip thus overcomes numerous shortcomings of clamps and the like heretofore used, and it imparts added advantages to the assembly and to the manufacturing process. It is low in cost and it fulfills its function without danger of accidental displacement or loss under the impulse of vibration or shock loads.

Preferably, the clip is made of metal, so that it has the heat and chemical resistance of that material.

The retaining clip is a unitary structure formed from a sheet of resilient material. The structure includes in one of its forms, a large diameter hole having a smaller diameter semi-circular extension, the composite hole resembling a keyhole; and a locking member extending over the keyhole. The relative dimensions of the retaining clip is such that when the installation is made, the edge of the sheet material which defines the semi-circular extension engages a groove in the core tube and the locking member engages an end of the core tube, thereby locking the retaining clip to the core tube, and locking the core tube against axial movement into the solenoid housing.

In another form of the invention, the keyhole is replaced by an open-ended slot.

Additional objects and features of this invention will become apparent by reference to the following description in conjunction with the accompanying drawings, in which:

FIG. 1 is a cross-sectional view of a solenoid assembly having a retaining clip according to the invention, the retaining clip being shown in an initial engagement position with the solenoid assembly and locked to the solenoid assembly;

FIG. 2 is a partial top view of the solenoid assembly showing the initial engagement of the retaining clip with the solenoid assembly;

FIG. 3 is a partial top view of the solenoid assembly showing the retaining clip locked to the solenoid assembly;

FIG. 4 is a perspective view of the retaining clip; and

FIG. 5 is a bottom view of another embodiment of a retaining clip according to the invention.

The solenoid assembly shown in FIG. 1 comprises a housing 10 having opposed walls 11 and 12. Alqgned openings are formed in these walls to allow the opposite ends of a core tube to project outwardly beyond them. The core tube 13 shown encloses a plug nut 14. An armature or core 15 is movable toward and away from the plug nut 14, the movements being controlled by a spring 16 and a solenoid winding 17 encircling the tube. In the arrangement chosen for illustration, the core movements are transmitted to a device to be controlled, e.g., a valve, through the open end of the core tube 13 shown at the bottom of FIG. 1. The opposite or upper end is closed, as shown. It is this end which is engaged by the improved retaining device to prevent the tube end from retreating into the housing 10.

Adjacent to its closed end the core tube 13 is preipherally contoured to provide a circumferential groove or equivalent reduction in diameter, the narrower part 18 lying substantially adjacent to the housing wall 11. The clip 20 shown in FIGS. 2, 3, and 4 is applicable to the core tube end to establish a firm engagement with the narrow part 18. More specifically, the clip 20 is a unitary structure which, for example, may be a sheet metal stamping. The clip 20 includes a main section 21 having a hole 22 and a locking member 23. The hole 22 includes a circular section 24 and a radial extension 25 having a semi-circular end. The locking member 23 includes an arm 26, which is substantially parallel to the main section 21, and a projection 27 extending perpendicularly from the free end of arm 26 toward the main section 21. Preferably, the main section 21 is arcuate, the top surface 28 of the section 21 being convex (see FIG. 1). As more fully described below, this arc shape, in combination with the resilient properties of the sheet metal, will enable the clip 20 to compensate for manufacturing tolerances associated with the components of the solenoid assembly.

The circular section 24 of the hole 22 is so dimensioned with respect to the core tube 13 with which it is to be used, that it may be readily slipped over the core tube end as shown in FIG. 2 to partially encircle the tube. The diameter of hole extension 25, on the other hand, is about equal to the external diameter of groove 18. If, when the circular section 24 of the hole and the core tube 13 are engaged, the main section 21 is pushed against the housing wall 11 as shown in broken lines in FIG. 1, the projection 27 abuts against the end of the core tube, thereby bending the arm 26 upwardly and tensioning the clip material. Also, the radial extension 25 of hole 22 is brought into horizontal alignment with the groove 18 of the core tube. Thereafter, if the clip is moved in the direction of arrow A (FIG. 2) along the housing wall 11, the edges of the radial hole extension 25 slidably engage the circumferential groove 18, and the projection 27 is brought out of engagement with the end of the core tube 13. The inherent resiliency of the clip material causes projection 27 to snap downwardly into the position shown in solid lines in FIGS. 1 and 3, thereby locking the clip to the core tube 13 and locking the core tube 13 to the housing 10. The position of projection 27 prevents return movement of the clip in the direction opposite that of arrow A, and engagement of the edge of hole extension 25 with groove 18, together with the abutment between the main section 21 and the housing 10, prevents axial movement of the core tube 13 into the housing 10. In addition, if when the clip 20 is moved into the locking position, the distance between the apex of the arc of main section 21 and the wall 11 is greater than the distance between the circumferential groove 18 and the wall 11, the engagement straightens the main section 21, thereby causing an upward bias to be applied to the core tube 13 which reduces axial play in the resulting solenoid assembly.

The use of the clip 20 is simple and expeditious, and requires no special tools. During the manufacturing process, the parts of the solenoid assembly are first assembled within the housing 10 and the open end of the core tube may be secured in any desired manner to the adjacent wall 12 of the housing or to the valve or other unit on which the solenoid assembly is mounted. The clip 20 is then placed onto the core tube 13 and is snapped into place.

To remove the clip 20 from a solenoid assembly, the arm 26 must be pried up so that the projection 27 will clear the end of the core tube 13. The clip 20 can then be moved in the direction opposite to arrow A so as to disengage the radial extension 25 from the core tube. Thereafter, the clip 20 may be lifted away from the core tube 13. Thus, removal can be achieved only by deliberate intent, and accidental separation, or displacement by vibration or shock forces is avoided.

Although the clip 20 described includes a main section 21 having a hole 22, it is within the spirit and scope of the subject invention to have other and equivalent means for engaging the narrow part 18 of the circumferential groove. For example, the main section 21 may be replaced by a yokelike structure 30 (see FIG. 5) which is slidably engageable with the circumferential groove of the core tube 13. In this case, the width of slot 31 is made about equal to the external diameter of groove 18.

It will be understood that the returning clip 20 is intended to be manufactured in various sizes, for application to solenoid assemblies of different kinds. In some respects, the invention is of wider applicability, and might be used for the general purpose of clamping or gripping any cylindrical part (e.g. a shaft or spindle) corresponding in exteranl nature to the projecting core tube end herein described. Therefore, it is to be understood that the description herein of preferred embodiments according to the invention is set forth as an example thereof and is not to be construed or interpreted as a limitation on the claims which follow and define the invention.

What is Claimed is:

1. An assembly comprising:
   a. an elongated element having a peripheral groove,
   b. a wall having a hole through which said elongated element extends, and
   c. a retaining clip including:
      I. a main section movable transversely with respect to the longitudinal axis of said element into engagement with said peripheral groove to limit the axial mobility of said element with respect to said wall, and
      II. a locking member having a projection engageable only with said elongated element for preventing transverse movement of said main section with respect to said element in a direction which causes disengagement of said main section and said groove.

2. An assembly as defined in claim 1 wherein said main section includes sheet material having an edge which is engageable with the peripheral groove.

3. An assembly as defined in claim 2 wherein said edge is U-shaped.

4. An assembly as defined in claim 2 wherein said edge is defined by a hole in the main section.

5. An assembly as defined in claim 1 wherein the locking member includes an arm extending over the main section, and the projection extends perpendicularly from an end of the arm toward the main section.

6. An assembly as defined in claim 5 wherein said arm is yieldable in a direction away from said main section to permit assembly of said clip with said elongated element, and means biasing said arm back toward its original position with respect to said main section when said arm is bent away from said main section.

7. An assembly as defined in claim 1 wherein the main section and locking member are formed from a single piece sheet material.

8. An assembly as defined in claim 7 wherein the sheet material is sheet metal.

9. An assembly as defined in claim 1 wherein the wall having a hole forms part of a solenoid housing, and the element having a peripheral groove is a core tube.

10. An assembly as defined in claim 9 wherein said main section includes sheet material having an edge engageable with the peripheral groove; and the locking member includes an arm extending over the main section and connected at one end to the main section, and the projections extend perpendicularly from the other end of the arm toward the main section.

11. An assembly as defined in claim 1 wherein said main section is formed of resilient material and has an upwardly convex shape.

* * * * *